(12) United States Patent
Herbold

(10) Patent No.: US 7,868,752 B1
(45) Date of Patent: Jan. 11, 2011

(54) METHOD AND APPARATUS FOR CONCEALING SENSORS IN SIMULATED ARTICLES

(76) Inventor: Daniel J. Herbold, 181 Jonathan St., Destrehan, LA (US) 70047

( * ) Notice: Subject to any disclaimer, the term of this patent is extended or adjusted under 35 U.S.C. 154(b) by 456 days.

(21) Appl. No.: 10/910,415

(22) Filed: Aug. 3, 2004

Related U.S. Application Data

(60) Provisional application No. 60/508,761, filed on Oct. 3, 2003.

(51) Int. Cl.
*G08B 1/08* (2006.01)

(52) U.S. Cl. .............................. 340/539.13; 340/426.15; 340/426.19; 340/988; 340/989; 701/213; 701/207

(58) Field of Classification Search ............ 340/539.13, 340/426.15, 426.19, 988, 989; 701/231, 701/207, 709
See application file for complete search history.

(56) References Cited

U.S. PATENT DOCUMENTS

| | | | |
|---|---|---|---|
| 6,055,426 A | 4/2000 | Beasley | |
| 6,269,763 B1 | 8/2001 | Woodland | |
| 6,295,449 B1 | 9/2001 | Westerlage et al. | |
| 6,301,545 B1 | 10/2001 | Brodie | |
| 6,427,127 B1 | 7/2002 | Cunningham | |
| 6,499,476 B1 | 12/2002 | Reddy | |
| 6,522,301 B2 | 2/2003 | Takayama et al. | |
| 6,542,076 B1 | 4/2003 | Joao | |
| 6,801,853 B2* | 10/2004 | Workman | 701/213 |
| 2002/0120394 A1* | 8/2002 | Rayne | 701/207 |
| 2004/0027277 A1* | 2/2004 | Diggelen et al. | 342/357.09 |

* cited by examiner

*Primary Examiner*—Tai T Nguyen
(74) *Attorney, Agent, or Firm*—Garvey, Smith, Nehrbass & North, L.L.C.; Brett A. North

(57) ABSTRACT

The present invention provides a method of monitoring the position of a vehicle, vessel, rail car, barge, tanker truck that is loaded with bulk or hazardous material. A G.P.S unit is set to send a signal to a radio transmitter if the unit moves beyond a maximum permissible distance (for example, 50 feet or more). An oxygen sensor can be used to send a signal to a radio transmitter if oxygen levels fall below a selected minimum concentration. The radio transmitter can send the message to a tugboat crew, police department, fire department, company headquarters, civil defense office or other personnel if either of the unit has moved beyond the selected maximum travel distance or if oxygen levels fall below a minimum concentration. In addition to the radio transmission of oxygen concentration data and/or G.P.S position data, visible or audible alarms can be used such as strobe light, horn or the like. Also disclosed is a system for concealment of chemical and/or biological sensors in a building for urban or industrial environments.

6 Claims, 6 Drawing Sheets

METHOD AND APPARATUS FOR CONCEALING SENSORS IN SIMULATED ARTICLES

CROSS-REFERENCE TO RELATED APPLICATIONS

Priority of U.S. provisional patent No. 60/508,761, filed Oct. 3, 2003, is hereby claimed.

U.S. provisional patent No. 60/508,761, filed Oct. 3, 2003, is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

The present invention relates to safety devices for monitoring the position of barges, rail cars, containers or other vehicles moving through a port or rail yard and that can radio position and/or oxygen levels to appropriate personnel.

It is common for large numbers of vehicles or vessels to be parked, moored, etc. in an area where they are not carefully monitored. For example, many barges are moored in the Mississippi River in a raft such as, for example, several barges wide and as much as a quarter of a mile long. During the night, these barges can become dislodged from their mooring creating a hazard to navigation.

Many of these barges carry hazardous cargo that can leak creating a health hazard for persons in the immediate area should leaks occur.

Many patents have issued that are directed to monitoring the position of a mobile unit as noted in the following table:

TABLE 1

| U.S. PAT. NO. | TITLE | ISSUE DATE |
| --- | --- | --- |
| 6,055,426 | Notification of a Mobile Unit Out of Coverage | Apr. 25, 2000 |
| 6,269,763 | Autonomous Marine Vehicle | Aug. 7, 2001 |
| 6,295,449 | Data Messaging in a Communications Network Using a Feature Request | Sep. 25, 2001 |
| 6,301,545 | Global Positioning System Tag System | Oct. 9, 2001 |
| 6,427,127 | Vibrating Conduit Process Parameter Sensors, Operating Methods and Computer Program Products Utilizing Complex Modal Estimation | Jul. 30, 2002 |
| 6,499,476 | Vapor Pressure Determination Using Galvanic Oxygen Meter | Dec. 31, 2002 |
| 6,522,301 | Above Deck Unit for Automatic Identification System | Feb. 18, 2003 |
| 6,542,076 | Control, Monitoring and/or Security Apparatus and Method | Apr. 1, 2003 |

Each of the above referenced patents are incorporated herein by reference.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

The present invention provides a safety system that is in the form of a simulated vent pipe when mounted on a marine vessel such as a barge. This simulated vent pipe can be mounted to a magnetic base that is molded to look like a pipe flange. The magnetic base then can be attached to a selected location on a barge. Internally, the vent pipe can house selected components, such as a battery pack, radio transmitter, and an oxygen sensor that sends a signal using the radio transmitter if oxygen levels fall below a predetermined level such that is deemed safe. The vent pipe can include an upper section that is a one piece molded PVC vent pipe with a one quarter turn that locks the pipe to the magnetic base.

This vent pipe arrangement with magnetic base allows a small number of these devices to be positioned at selected locations so that personnel can monitor barges or rail cars or containers moving through a port, rail yard, etc.

The apparatus of the present invention thus provides a simple straightforward yet workable device for providing port or rail security.

The deployment plan of the present invention provides a response plan to assist governmental agencies and owners of barges, rail cars, containers and the like.

In one embodiment a radio message is provided when oxygen levels fall below a selected level or when a unit has moved beyond a selected distance from its desired location such as, for example, when the unit is moved beyond a distance of 50-500 feet, depending upon the sensitivity that is allowed by the operator.

In one embodiment a radio transmitter is provided and powered with a battery pack and having an oxygen sensor that signals with the radio transmitter if oxygen levels fall below a selected level. These internal parts are concealed within a simulated vent pipe to prevent theft, vandalism or detection of units by unauthorized personnel.

The present invention thus provides a simulated vent pipe that functions as an oxygen sensor and/or as a g.p.s. position indicator. These vent pipes are a cost effective way to increase security over a large area for barges, rail cars, containers or other like vessels or vehicles.

A tugboat crew, police department, fire department, commercial entity, civil defense office or other such entity can place the units of the present invention on moored barges, stationary rail cars, tanker trucks, or any other vessel loaded with bulk or hazardous material.

The g.p.s. unit can be set to send a signal using a radio transmitter if the selected vehicle or vessel moves, for example, 50 feet or more beyond a selected location.

An oxygen sensor can be provided that sends a signal using the radio transmitter if oxygen levels fall below a selected minimum concentration.

The provided radio transmitter can send a message to any selected entity such as a tugboat crew, police department, fire department, corporate headquarters, civil defense office, or the personnel at a selected location. Each unit can provide a g.p.s. position indicator that radios when it has moved more than a predetermined (agreed upon) distance or that an oxygen level is below a selected minimum concentration. Additionally, a warning light can be activated or other alarm activated when either the vehicle, vessel, or other unit has moved beyond a selected distance.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
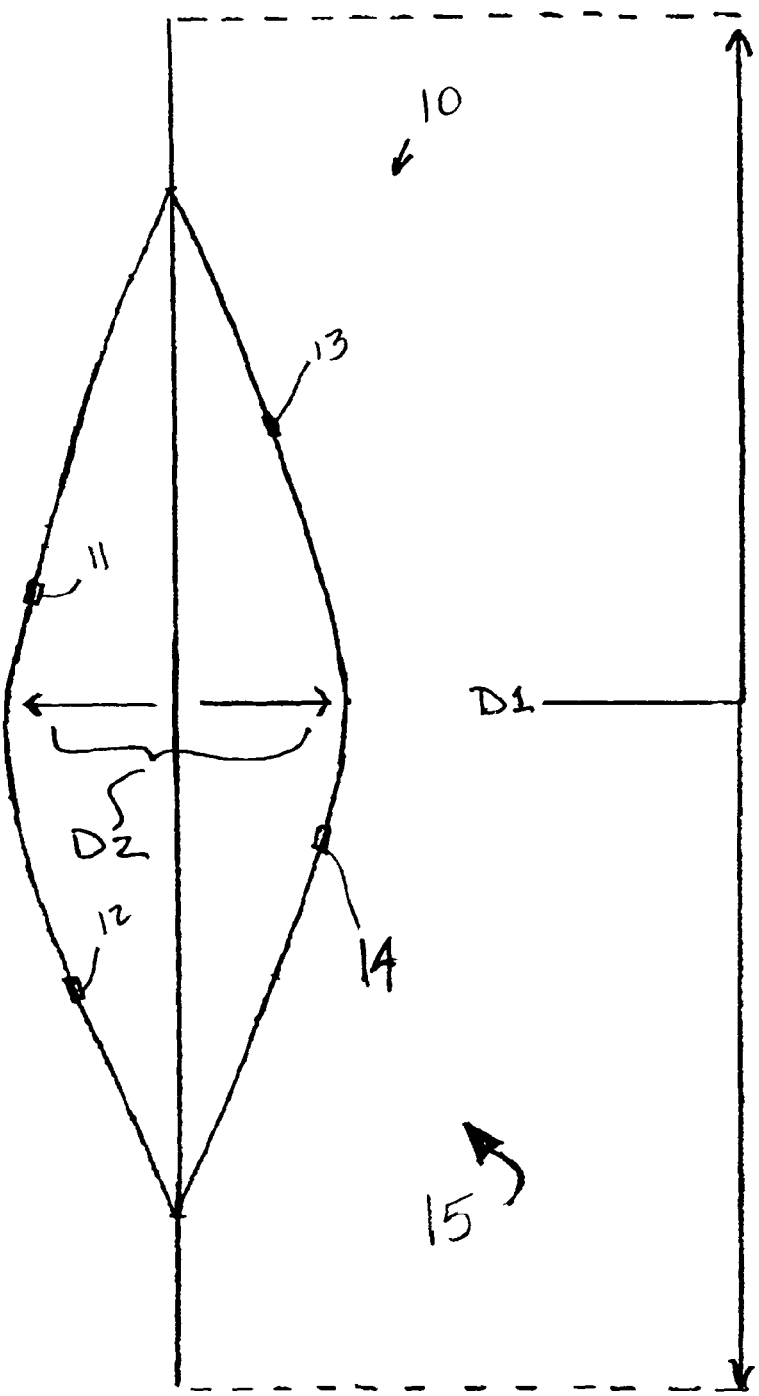
FIG. 1 is a schematic diagram illustrating placement of vent pipes on tank cars near the outside perimeter of the switch yard.

The present invention provides an improved method and apparatus for monitoring the position of selected vehicles or vessels such as barges, rail cars, containers and the like. In FIG. 1, a rail yard 10 is shown having vent pipes placed on tank cars at positions 11, 12, 13, 14 wherein the switch yard, designated generally by the numeral 15 is, for example, a quarter of a mile wide and one mile long. Placement of vent pipes in rail switch yard 15 can provide an early warning system for switch yards 15 located near population centers. The vent pipes can be placed on tank cars near the outside perimeter of switch yard 15. Distance D1 can be 1 mile. Distance D2 can be ¼ mile.

Figure 2:
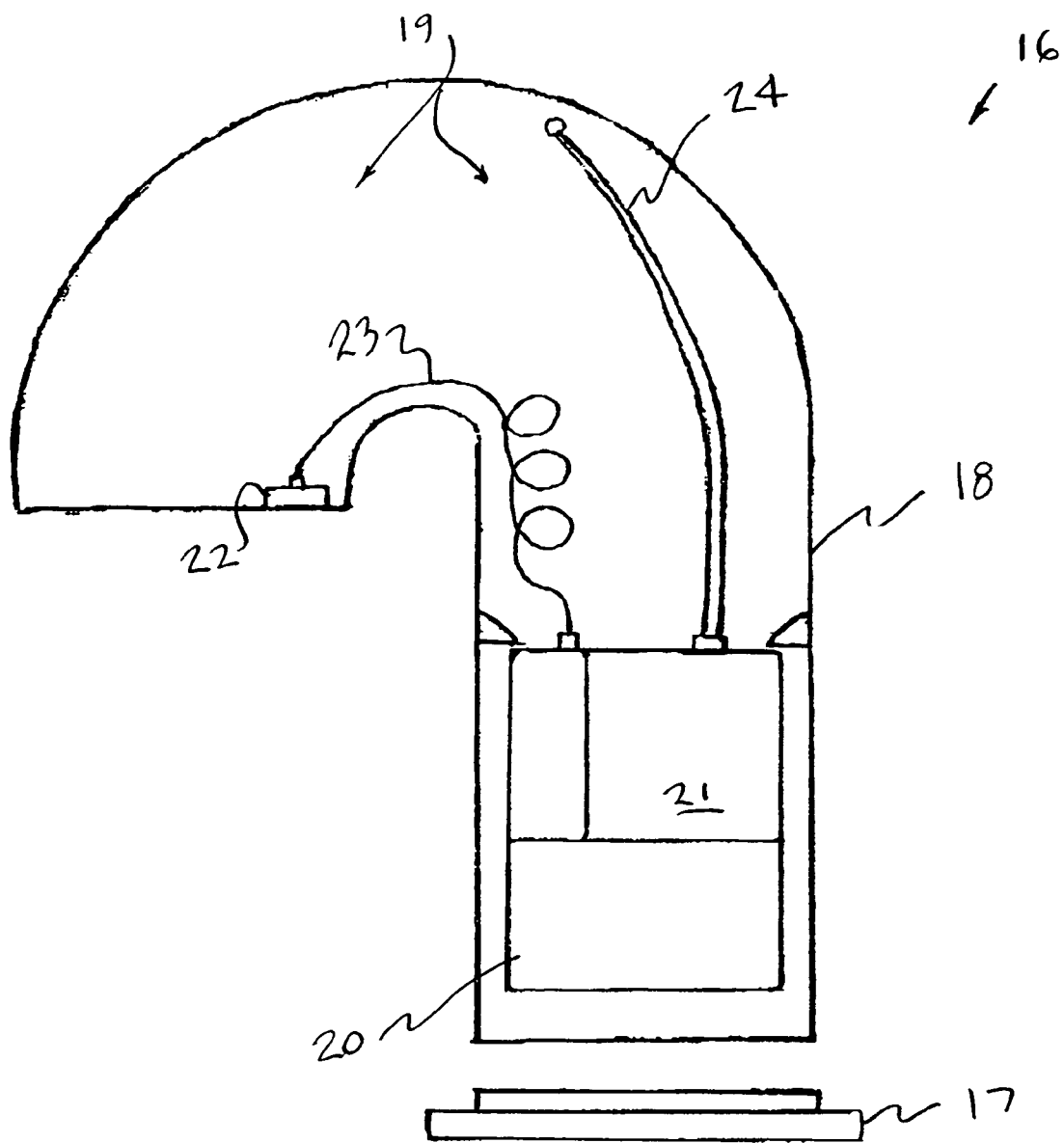
FIG. 2 is a sectional elevation view of the preferred embodiment of the apparatus of the present invention illustrating an oxygen sensor mated to a radio transmitter and concealed in a vent pipe that can be placed on a flat metallic surface or other metal container enclosing hazardous material.

FIG. 2 shows a sectional view of a simulated vent pipe 16 according to the present invention. The vent pipe includes a base 17 that is preferably magnetic and can be shaped or molded to look like a pipe flange.

Mounted to the base 17 is a simulated marine type vent pipe 18 that can be a three sixteenth inch wall thickness one piece molded PVC vent pipe. The vent pipe 18 and magnetic base 17 can interlock using a one quarter turn locking arrangement of the pipe 18 to the base 17. Base 17 can be molded to look like a pipe flange and vent pipe 18 can be constructed so that a one quarter turn locks vent pipe 18 to base 17.

The simulated vent pipe 18 provides an interior 19 that is hollow so that battery pack 20 and radio transmitter 21 can be contained therein. The radio transmitter 21 is interfaced with oxygen sensor 22 so that if the oxygen sensor 22 senses oxygen concentrations below a selected level (such as the ten percent figure indicated in FIG. 2), an instrumentation wire 23 interfaces the oxygen sensor with radio transmitter 21 to send a signal via antenna 24 that will be received by an appropriate law enforcement officer, company headquarters, control center or the like. Oxygen sensor 22 connected to radio transmitter 21 can be concealed in vent pipe 18 and placed on a flat surface or any metal container enclosing hazardous material(s).

Figure 3:
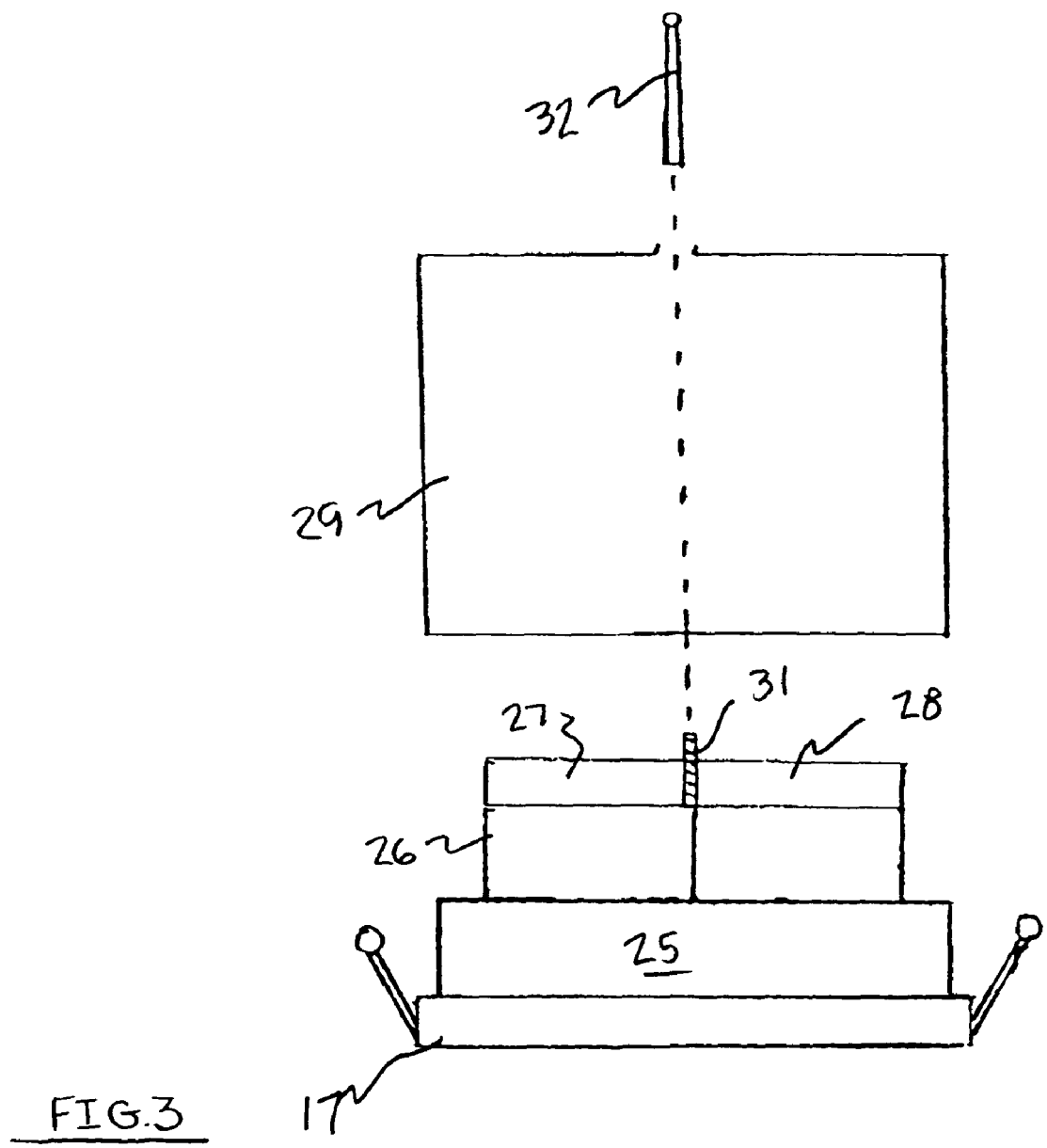
FIG. 3 is an exploded elevation view illustrating a G.P.S. position indicating device of the present invention.

In FIG. 3, the internal components of another sensor device are shown. In FIG. 3, only the magnetic base 17 is shown, its cover having been removed for purposes of clarity. Within interior 19 of pipe 18 there is provided a rechargeable battery pack 25 for powering G.P.S. unit 26, strobe light 27, and radio transmitter 28. The cover 29 provided in FIG. 3 can be a clear lexan, one piece molded cover that protects the base 17 battery pack 25 and components 26, 27, 28. Antenna 32 with base 31 can be used to send a signal using radio transmitter 28 that alerts appropriate rescue personnel or other law enforcement agency, fire department, police department or the like that a selected vessel (or vehicle) to which base 17 and components 25-32 are attached has shifted position more than a preselected minimum distance. A seal 33 can be included between cover 29 and antenna 32.

Figure 4:
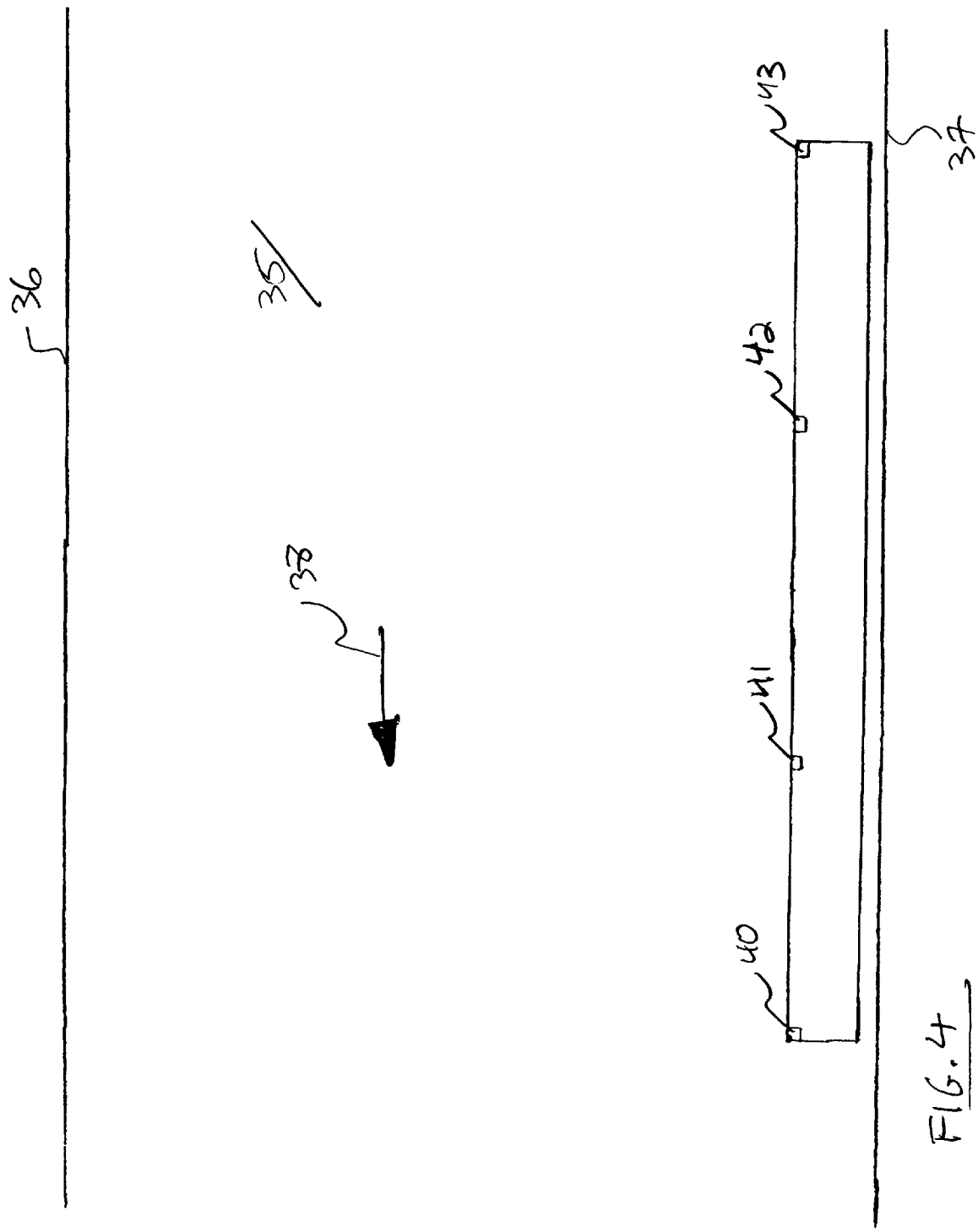
FIG. 4 is a schematic plan view illustrating placement of G.P.S. units on moored barges such as, for example, a raft of barges that are eight barges wide and one quarter mile long.

FIG. 4 is a schematic plan view illustrating placement of G.P.S. units 40, 41, 42, 43 on moored barges such as, for example, a raft of barges that are eight barges wide and one quarter mile long. In FIG. 4 is a river 35, such as the Mississippi River, with levees or river banks 36, 37 on either side of river 35 and having current 38.

Figure 5:
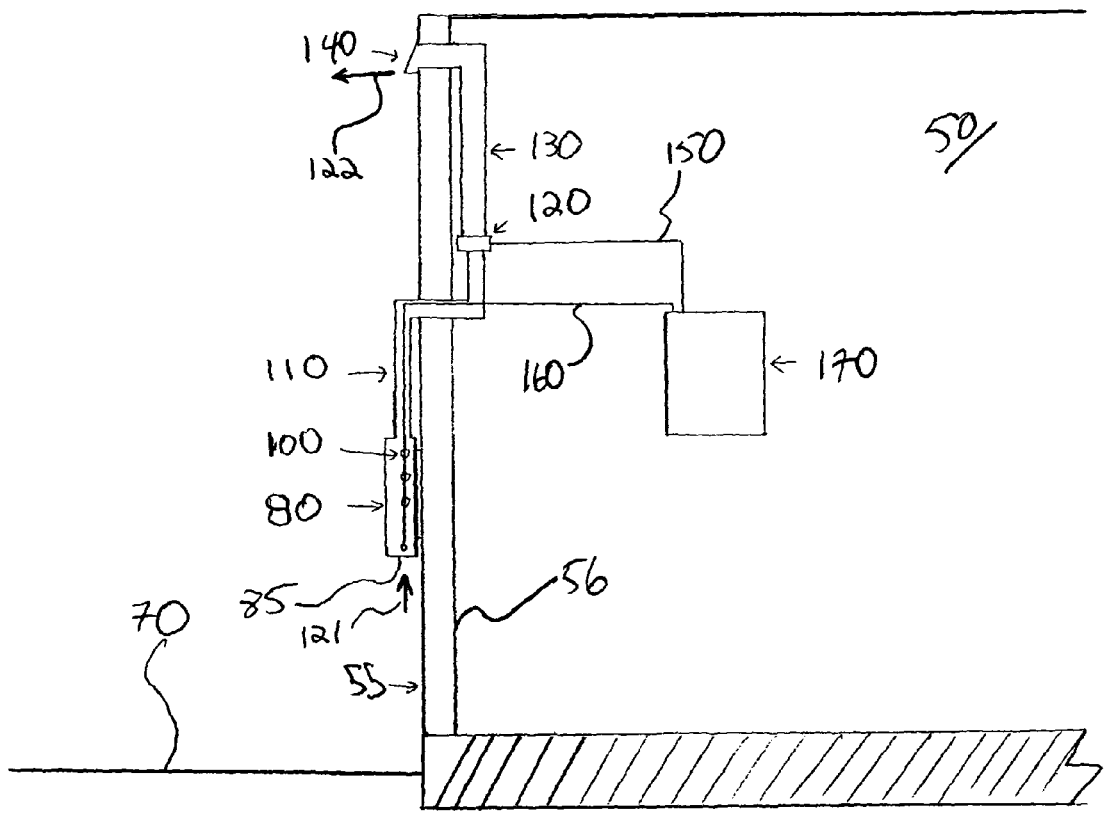
FIG. 5 is a schematic diagram showing a concealment system for a building.

FIG. 5 is a schematic diagram showing a concealment system for chemical and/or biological sensors 100 for a building 50. This system may be particularly applicable to governmental buildings which are located in an urban environment. Such a concealment system can deter vandalism of the sensors 100 by making them less noticeable. In FIG. 5 sensors 100 are concealed in a container 80 resembling an electrical breaker box and located on the exterior wall 55 of building 50. The container can include a plurality of openings 85 from which air can be drawn by a fan, such as inline fan 120. Inline fan 120 can be connected to container 80 through pipe 110. Pipe 110 can resemble ordinary electrical conduit pipe. Accordingly, where container 80 resembles an electrical breaker box and pipe 110 resembles electrical conduit then persons would believe it was merely an standard electrical breaker box which is not out of the ordinary and not providing an incentive to investigate further or vandalize. Air drawn through pipe 110 can be discharged through pipe 130 and vent 140. Air flow can be in the direction of arrows 121, 122. Vent 140 can resemble an ordinary dryer vent so as not to draw attention to the unit. Panel 170 can be located inside of building 50 and connected to sensors 100. Panel 170 can also supply power to fan 120 through power source 150. If chemical and/or biological agents are detected then a signal can be sent to panel 170 and an alarm issued. Panel 170 can be monitored by security personnel already in place in many government buildings, or signals from panel 170 can be sent to a remote monitoring station, such as through phone lines, computer lines such as the internet, or via radio signals.

Figure 6:
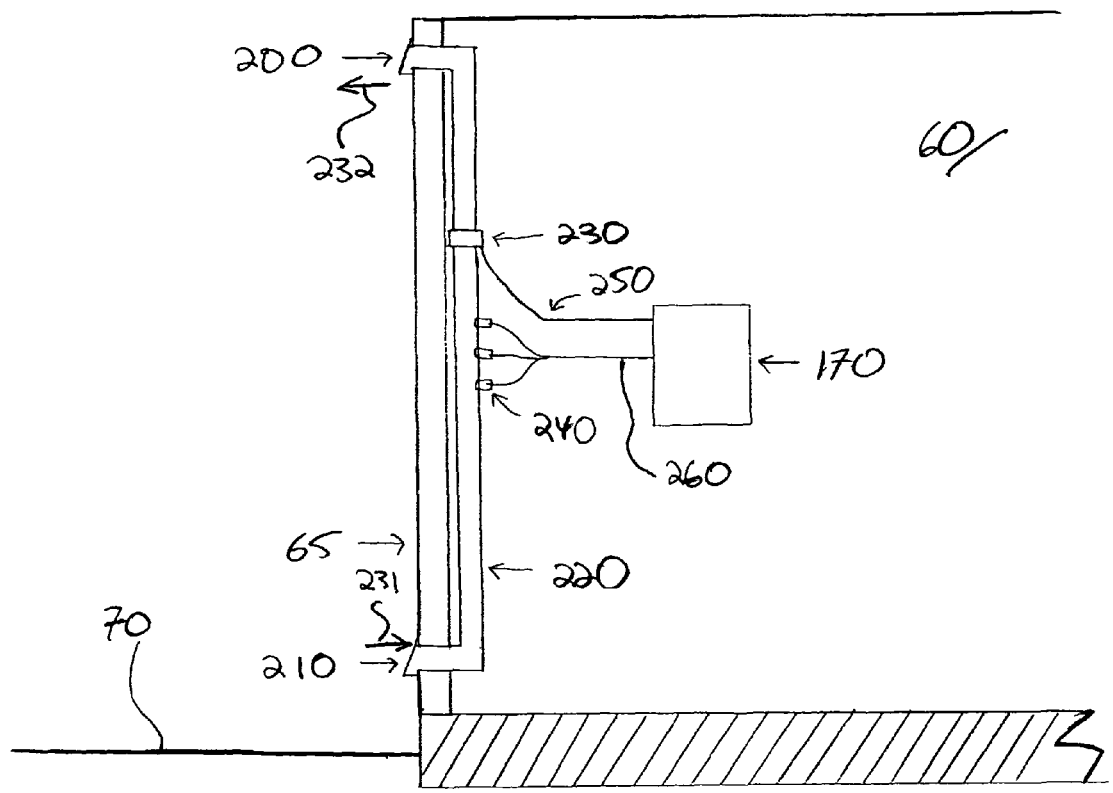
FIG. 6 is a schematic diagram shown an alternative concealment system for a building.

FIG. 6 is a schematic diagram showing an alternative concealment system for a building 60. In this alternative system a double vent system 210, 200 is all that is seen by the public. Vents 210, 200 can each resemble common ordinary dryer vents. Vents 210, 200 can be connected through pipe 220. Sensors 240 can be included in pipe 220. Fan 230 can be used to cause air to flow from vent 210 to vent 200. Air flow can be in the direction of arrows 231, 232. Panel 170 can be used to monitor and control sensors 240 through lines 260 and also supply power to fan 230 through power supply line 250. The operation of this system is similar to the system should in FIG. 5.

LIST OF REFERENCE NUMERALS

The following is a list of reference numerals used in this application.

| Reference Number | Description |
|---|---|
| 10 | rail yard |
| 11 | tank car |
| 12 | tank car |
| 13 | tank car |
| 14 | tank car |
| 15 | switch yard |
| 16 | simulated vent pipe |
| 17 | magnetic base |
| 18 | simulated vent pipe |
| 19 | pipe interior |
| 20 | battery pack |
| 21 | radio transmitter |
| 22 | oxygen sensor |
| 23 | instrumentation wire |
| 24 | antenna |
| 25 | battery pack |
| 26 | g.p.s. unit |
| 27 | strobe light |
| 28 | radio transmitter |
| 29 | cover |
| 31 | antenna base |
| 32 | antenna |
| 33 | seal |
| 35 | river |
| 36 | levee |
| 37 | levee |
| 38 | current |
| 40 | G.P.S. unit |
| 41 | G.P.S. unit |
| 42 | G.P.S. unit |
| 43 | G.P.S. unit |
| 50 | building |
| 55 | exterior wall |
| 56 | interior wall |
| 60 | building |
| 65 | exterior wall |
| 70 | ground level |
| 80 | electrical breaker box |
| 85 | openings |
| 90 | holes |
| 100 | sensors |
| 110 | electrical conduit pipe |
| 120 | fan |
| 121 | arrow |
| 122 | arrow |
| 130 | pipe |
| 140 | vent |
| 150 | power supply |
| 160 | wires |
| 170 | panel |
| 200 | vent |
| 210 | vent |
| 220 | pipe |
| 230 | fan |
| 231 | arrow |
| 232 | arrow |
| 240 | sensors |
| 250 | power supply |
| 260 | wires |

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A method of monitoring a position shift of a selected vehicle, vessel, receptacle or hazardous material containing device comprising the steps of:
 a) providing a g.p.s. unit and radio transmitter contained within a housing;
 b) monitoring the position of the selected vessel or vehicle with the g.p.s. units; and
 c) transmitting a signal when the g.p.s. unit indicates that the selected vessel or vehicle has moved a distance beyond a predetermined selected maximum distance of travel;
 d) wherein the housing is a simulated article, and
 e) wherein in step "d" the simulated article is a vent pipe, wherein the housing includes a magnetic base molded to resemble a pipe flange.

2. The method of claim 1, wherein the housing includes an upper section that is a one piece molded PVC vent pipe.

3. A method of monitoring a position shift of a selected vehicle, vessel, receptacle or hazardous material containing device comprising the steps of:
 a) providing a g.p.s. unit and radio transmitter contained within a housing;
 b) monitoring the position of the selected vessel or vehicle with the g.p.s. units; and
 c) transmitting a signal when the g.p.s. unit indicates that the selected vessel or vehicle has moved a distance beyond a predetermined selected maximum distance of travel; and
 d) wherein the housing is a simulated article, wherein in step "d", the housing includes an oxygen sensor and the oxygen sensor sends a signal using the radio transmitter if oxygen levels fall below a predetermined level.

4. The method of claim 3, wherein in step "c" the selected maximum distance of travel is between 50 to 500 feet.

5. The method of claim 3, wherein in step "c" the selected maximum distance of travel is dependent on a sensitivity that is allowed by an operator.

6. A method of monitoring a position shift of a selected vehicle, vessel, receptacle or hazardous material containing device comprising the steps of:
 a) providing a g.p.s. unit and radio transmitter contained within a housing;
 b) monitoring the position of the selected vessel or vehicle with the g.p.s. units; and
 c) transmitting a signal when the g.p.s. unit indicates that the selected vessel or vehicle has moved a distance beyond a predetermined selected maximum distance of travel; and
 d) wherein the housing is a simulated article, wherein in step "c" an alarm is activated when the signal is transmitted.

* * * * *